(12) United States Patent
van Zanten et al.

(10) Patent No.: US 8,418,761 B2
(45) Date of Patent: Apr. 16, 2013

(54) STIMULI-RESPONSIVE HIGH VISCOSITY PILL

(75) Inventors: Ryan van Zanten, Spring, TX (US); Ryan G. Ezell, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 421 days.

(21) Appl. No.: 12/846,096

(22) Filed: Jul. 29, 2010

(65) Prior Publication Data

US 2012/0024529 A1    Feb. 2, 2012

(51) Int. Cl.
| | |
|---|---|
| *E21B 43/22* | (2006.01) |
| *E21B 43/25* | (2006.01) |
| *E21B 43/26* | (2006.01) |
| *E21B 43/267* | (2006.01) |
| *C09K 8/60* | (2006.01) |
| *C09K 8/68* | (2006.01) |
| *C09K 8/88* | (2006.01) |

(52) U.S. Cl.
USPC ..... 166/280.1; 166/297; 166/300; 166/305.1; 166/308.2; 507/211; 507/224; 507/225; 507/226; 507/922; 507/925

(58) Field of Classification Search .................... 507/211
See application file for complete search history.

(56) References Cited

U.S. PATENT DOCUMENTS

| | | | |
|---|---|---|---|
| 2,779,418 | A | 1/1957 | Garst |
| 2,935,129 | A * | 5/1960 | Allen et al. ................. 166/308.3 |
| 4,695,389 | A | 9/1987 | Kubala |
| 4,725,372 | A | 2/1988 | Teot et al. |
| 5,030,366 | A | 7/1991 | Wilson et al. |
| 5,309,999 | A | 5/1994 | Cowan et al. |
| 5,314,022 | A | 5/1994 | Cowan et al. |
| 5,361,842 | A | 11/1994 | Hale et al. |
| 5,373,901 | A | 12/1994 | Norman et al. |
| 5,515,921 | A | 5/1996 | Cowan et al. |
| 5,551,516 | A | 9/1996 | Norman et al. |
| 5,663,123 | A | 9/1997 | Goodhue, Jr. et al. |
| 5,804,535 | A | 9/1998 | Dobson et al. |
| 5,879,699 | A | 3/1999 | Lerner |
| 5,979,555 | A | 11/1999 | Gadberry et al. |
| 5,996,692 | A | 12/1999 | Chan et al. |
| 6,063,737 | A | 5/2000 | Haberman et al. |
| 6,063,738 | A | 5/2000 | Chatterji et al. |
| 6,239,183 | B1 | 5/2001 | Farmer et al. |
| 6,283,213 | B1 | 9/2001 | Chan |
| 6,435,277 | B1 | 8/2002 | Qu et al. |
| 6,444,316 | B1 | 9/2002 | Reddy et al. |
| 6,506,710 | B1 | 1/2003 | Hoey et al. |
| 6,527,051 | B1 | 3/2003 | Reddy et al. |
| 6,547,871 | B2 | 4/2003 | Chatterji et al. |
| 6,554,071 | B1 | 4/2003 | Reddy et al. |
| 6,831,043 | B2 | 12/2004 | Patel et al. |
| 6,881,709 | B2 | 4/2005 | Nelson et al. |
| 6,908,888 | B2 | 6/2005 | Lee et al. |
| 7,060,661 | B2 | 6/2006 | Dobson, Sr. et al. |
| 7,081,439 | B2 * | 7/2006 | Sullivan et al. ................ 507/269 |
| 7,084,095 | B2 | 8/2006 | Lee et al. |
| 7,159,659 | B2 | 1/2007 | Welton et al. |
| 7,238,648 | B2 | 7/2007 | Dahayanake et al. |
| 7,279,446 | B2 | 10/2007 | Colaco et al. |
| 7,293,609 | B2 | 11/2007 | Dealy et al. |
| 7,299,874 | B2 | 11/2007 | Welton et al. |
| 7,303,019 | B2 | 12/2007 | Welton et al. |
| 7,320,952 | B2 | 1/2008 | Chen et al. |
| 7,341,980 | B2 | 3/2008 | Lee et al. |
| 7,351,681 | B2 | 4/2008 | Reddy et al. |
| 7,387,987 | B2 | 6/2008 | Chen et al. |
| 7,527,103 | B2 | 5/2009 | Huang et al. |
| 7,547,663 | B2 | 6/2009 | Kirsner |
| 7,858,561 | B2 * | 12/2010 | Abad et al. ..................... 507/219 |
| 7,985,718 | B2 | 7/2011 | Steinbrenner et al. |
| 8,148,303 | B2 | 4/2012 | Van Zanten et al. |
| 2002/0193257 | A1 | 12/2002 | Lee et al. |
| 2003/0054962 | A1 * | 3/2003 | England et al. ................ 507/117 |
| 2003/0134751 | A1 * | 7/2003 | Lee et al. ....................... 507/200 |
| 2004/0043905 | A1 | 3/2004 | Miller et al. |
| 2005/0107265 | A1 * | 5/2005 | Sullivan et al. ................ 507/271 |
| 2005/0107503 | A1 * | 5/2005 | Couillet et al. ................ 524/249 |
| 2005/0119401 | A1 | 6/2005 | Bavouzet et al. |
| 2005/0194145 | A1 | 9/2005 | Beckman et al. |
| 2005/0252659 | A1 | 11/2005 | Sullivan et al. |
| 2006/0046937 | A1 | 3/2006 | Fu et al. |
| 2006/0081372 | A1 | 4/2006 | Dealy et al. |

(Continued)

FOREIGN PATENT DOCUMENTS

| | | |
|---|---|---|
| EP | 0 037 699 A2 | 10/1981 |
| EP | 2 085 448 A1 | 8/2009 |

(Continued)

OTHER PUBLICATIONS

International Search Report and Written Opinion for PCT/GB2011/001386 dated Dec. 2, 2011.

(Continued)

*Primary Examiner* — George Suchfield
(74) *Attorney, Agent, or Firm* — Craig W. Roddy; McDermott Will & Emery LLP

(57) ABSTRACT

A method comprises providing a treatment fluid having a first viscosity comprising an aqueous base fluid; a viscoelastic surfactant; and a stimuli-responsive water-soluble polymer; introducing the treatment fluid into a subterranean formation; and allowing the treatment fluid viscosity to change to a second viscosity in response to a stimulus.

23 Claims, No Drawings

U.S. PATENT DOCUMENTS

| | | | |
|---|---|---|---|
| 2006/0128597 A1 | 6/2006 | Chen et al. | |
| 2006/0183646 A1 | 8/2006 | Welton et al. | |
| 2006/0258541 A1 | 11/2006 | Crews | |
| 2007/0012445 A1 | 1/2007 | Nguyen et al. | |
| 2007/0066491 A1 | 3/2007 | Bicerano et al. | |
| 2007/0114022 A1 | 5/2007 | Nguyen | |
| 2007/0123431 A1 | 5/2007 | Jones et al. | |
| 2007/0215355 A1 | 9/2007 | Shapovalov et al. | |
| 2007/0281869 A1 | 12/2007 | Drochon et al. | |
| 2007/0284103 A1 | 12/2007 | Dealy et al. | |
| 2008/0110618 A1 | 5/2008 | Quintero et al. | |
| 2008/0119374 A1 | 5/2008 | Willberg et al. | |
| 2008/0121395 A1 | 5/2008 | Reddy et al. | |
| 2008/0194435 A1 | 8/2008 | Huff et al. | |
| 2008/0236823 A1 | 10/2008 | Willberg et al. | |
| 2009/0008091 A1 | 1/2009 | Quintero et al. | |
| 2009/0111716 A1 | 4/2009 | Hough et al. | |
| 2010/0031418 A1 | 2/2010 | Op't Hof | |
| 2010/0056405 A1 | 3/2010 | Ali et al. | |
| 2010/0081586 A1* | 4/2010 | Smith et al. | 507/211 |
| 2010/0081587 A1 | 4/2010 | Van Zanten et al. | |
| 2010/0263863 A1 | 10/2010 | Quintero et al. | |
| 2010/0300759 A1 | 12/2010 | Passade-Boupat et al. | |
| 2011/0005773 A1 | 1/2011 | Dusterhoft et al. | |
| 2011/0048716 A1 | 3/2011 | Ezell | |
| 2011/0048718 A1 | 3/2011 | Van Zanten et al. | |
| 2011/0053812 A1 | 3/2011 | Ezell et al. | |
| 2011/0071056 A1 | 3/2011 | Saini et al. | |

FOREIGN PATENT DOCUMENTS

| | | |
|---|---|---|
| GB | 2 383 355 A | 6/2003 |
| GB | 2457151 A | 8/2009 |
| WO | WO 02/070862 A1 | 9/2002 |
| WO | WO02070862 A1 | 9/2002 |
| WO | WO 2009/006251 A1 | 1/2009 |
| WO | WO 2009/030868 A2 | 3/2009 |
| WO | WO2011/023966 A1 | 3/2011 |
| WO | WO2012/001361 A1 | 1/2012 |
| WO | WO2012038704 A1 | 3/2012 |

OTHER PUBLICATIONS

Office Action for U.S. Appl. No. 12/551,334 dated Jul. 21, 2011.

International Search Report and Written Opinion for PCT/GB2012/000411 dated Jul. 19, 2012.

International Preliminary Report on Patentability for PCT/GB2010/0001629 dated Mar. 15, 2012.

Schlumberger, ClearFRAC LT Surfactant Article, Apr. 2005.

Crews et al., New Technology Improves Performance of Viscoelastic Surfactant Fluids, SPE-Drilling & Completion, 23, 41-47, 2008.

Samuel et al., Polymer-Free Fluid for Hydraulic Fracturing, SPE 38622, 1997.

Samuel, et al., A New Solids-Free Non-Damaging High Temperature Lost-Circulation Pill: Development and First Field Applications, SPE 81494, 2003.

Massiera et al., Hairy Wormlike Micelles: Structure and Interactions, Langmuir, 18, 5867-5694, 2002.

Massiera et al., The Steric Polymer Layer of Hairy Wormlike Michelles, Journal of Physics: Condensed Matter, 15, S225-S231, 2003.

Ramos et al., Structure of a New Type of Transient Network: Entangled Wormlike Micelles Bridged by Telechelic Polymers, Macromolecules, 40, 1248-1251, 2007.

Van Zanten, Dissertation, University of California Santa Barbara, pp. 74-143, 2007.

Ingram et al., Enhancing and Sustaining Well Production: Granite Wash, Texas Panhandle, SPE 106531, 2007.

Hellweg, Phase Structures of Microemulsions, Current Opinion in Colloid and Interface, Science 7, 50-56, 2003.

Kunieda et al., Effect of Added Salt on the Maximum Solubilization in an Ionic-Surfactant Microemulsion, Langmuir, 12, 5796-5799, 1996.

Gotch, et al., Formation of Single-Phase Microemulsions in Toluene/Water/Nonionic Surfactant Systems, Langmuir, 24, 4485-4493, 2008.

Welton, et al., Anionic Surfactant Gel Treatment Fluid, Society of Petroleum Engineers, SPE 105815, 2007.

Penny et al., "The Application of Microemulsion Additives in Drilling and Stimulation Results in Enhanced Gas Production," 2005 SPE Production and Operations Symposium held in Oklahoma City, OK, SPE 94274.

International Search Report and Written Opinion for PCT/GB2011/001136 dated Sep. 29, 2011.

International Search Report and Written Opinion for PCT/GB2011/000988 dated Oct. 12, 2011.

International Search Report and Written Opinion for PCT/GB2010/001630 dated Oct. 19, 2010.

International Search Report and Written Opinion for PCT/GB2010/001631 dated Oct. 19, 2010.

* cited by examiner

STIMULI-RESPONSIVE HIGH VISCOSITY PILL

BACKGROUND

The present invention relates to methods and compositions useful in subterranean applications, and, more specifically, to stimuli-responsive treatment fluids.

Viscosified treatment fluids that are used in subterranean operations are often aqueous-based fluids that comprise gelling agents. The gelling agents used to form gels often comprise macromolecules such as biopolymers or synthetic polymers. Common gelling agents include, e.g., galactomannan gums, cellulosic polymers, and other polysaccharides. As used herein, the term "treatment fluid" refers to any fluid that may be used in a subterranean application in conjunction with a desired function and/or for a desired purpose. The term "treatment fluid" does not imply any particular action by the fluid or any component thereof.

Most viscosified treatment fluids include cross-linking agents that form a cross-link between gelling agent molecules and a suitable cross-linking agent. These cross linking agents may comprise a metal, a metal complex, or a metalloid, collectively referred to herein as "metal(s)." Examples may include compounds containing boron, aluminum, antimony, zirconium, magnesium, or titanium. Generally, the metal of a cross linking agent interacts with at least two gelling agent molecules to form a crosslink between them, thereby forming a cross-linked gelling agent. The term "cross-linked gelling agent" as used herein refers to a gelling agent that contains, on average, at least one crosslink per molecule. This may be indicated when the elastic modulus (G') satisfies the equation G'>G" at certain frequencies. The elastic modulus of a gel is an accepted standard measure of a gel's elasticity.

Pills are often used in subterranean applications. The term "pill" as used herein refers to a relatively small volume of specially prepared fluid placed or circulated in the well bore. Fluid pills are commonly prepared for a variety of special functions, such as a sweep pill prepared at high viscosity to circulate around the well bore and pick up debris or well bore fill. In counteracting lost-circulation problems, a lost-circulation pill prepared with flaked or fibrous material is designed to plug the perforations or formation interval losing the fluid. A "fluid-loss control pill" is a gelled fluid that is designed or used to provide some degree of fluid-loss control. Through a combination of viscosity, fluid loss control agents, solids bridging, and cake buildup on the porous rock, these pills oftentimes are thought to seal off portions of the formation from fluid loss. They may also generally enhance filter-cake buildup on the face of the formation to inhibit fluid flow into the formation from the well bore. Pills often may involve a relatively small quantity (less than 200 bbl) of a special blend of a drilling fluid to accomplish a specific task that a regular drilling fluid cannot perform. Examples include high-viscosity pills to help lift cuttings out of a vertical well bore; aqueous pills to dissolve encroaching salt formations; pipe-freeing pills to destroy filter cake and relieve differential sticking forces; perforating pills for use during perforating operations; and lost circulation material pills to plug a thief zone.

Typically, pills comprise an aqueous base fluid and a high concentration of a gelling agent polymer, and, sometimes, bridging particles, like graded sand, potassium salts, or sized calcium carbonate particles. An example of a commonly used pill contains high concentrations (100 to 150 lbs/1000 gal) of a modified hydroxyethylcellulose ("HEC"). Some other gelling agent polymers that have been used include xanthan, guar, guar derivatives, carboxymethylhydroxyethylcellulose ("CMHEC"), and even starch.

As an alternative to linear polymeric gels for pills, cross-linked gels often are used. Cross linking the gelling agent polymer is thought to create a gel structure that is better able to support solids and possibly provide fluid-loss control. Further, cross-linked pills are thought to invade the formation face to a lesser extent to be desirably effective. To crosslink these gelling agents, a suitable cross linking agent that comprises polyvalent metal ions is often used. Complexes of aluminum, titanium, boron, and zirconium are common examples.

A disadvantage associated with conventional cross-linked gelling agents is that the resultant gel residue is often difficult to remove from the subterranean formation once the treatment has been completed. For example, in fracturing treatments, the cross-linked gels used are thought to be difficult to completely clean up with conventional breakers, such as oxidizers or enzymes. Similarly, the gel residue can be difficult and time-consuming to remove from the subterranean formation. The gel residue, at some point in the completion operation, usually should be removed to restore the formation's permeability, preferably to at least its original level. If the formation permeability is not restored to its original level, production levels can be significantly reduced. This gel residue often requires long cleanup periods. Moreover, an effective cleanup usually requires fluid circulation to provide high driving force, which is thought to allow diffusion to take place to help dissolve the concentrated buildup of the gel residue. Such fluid circulation, however, may not be feasible. In addition, gel residue can be difficult to break effectively. The term "break" (and its derivatives) as used herein refers to a reduction in the viscosity of the viscosified treatment fluid, e.g., by the breaking or reduction of the size of the viscosifying polymers. No particular mechanism is implied by the term. Another conventional method of cleaning up gel residue is to add a spot of a strong acid (e.g., 10% to 15% hydrochloric acid) with coiled tubing, which is expensive and can result in hazardous conditions.

SUMMARY

The present invention relates to methods and compositions useful in subterranean applications, and, more specifically, to stimuli-responsive treatment fluids.

In an embodiment, a method comprises providing a treatment fluid having a first viscosity comprising: an aqueous base fluid; a viscoelastic surfactant; and a stimuli-responsive water-soluble polymer; introducing the treatment fluid into a subterranean formation; and allowing the treatment fluid viscosity to change to a second viscosity in response to a stimulus.

In another embodiment, a method comprises providing a treatment fluid having a first viscosity and comprising: an aqueous base fluid; a viscoelastic surfactant; and a stimuli-responsive water soluble polymer; introducing the treatment fluid into a subterranean formation comprising a wellbore; forming a perforation in the wellbore in the presence of the treatment fluid; and allowing the treatment fluid viscosity to change in response to a stimulus.

In still another embodiment, a composition comprises an aqueous base fluid; a viscoelastic surfactant; and a stimuli responsive polymer, wherein the stimuli-responsive polymer is water soluble.

The features and advantages of the present invention will be apparent to those skilled in the art. While numerous changes may be made by those skilled in the art, such changes are within the spirit of the invention.

DESCRIPTION OF THE PREFERRED EMBODIMENTS

The present invention relates to methods and compositions useful in subterranean applications, and, more specifically, to stimuli-responsive treatment fluids.

The treatment fluids of the present invention can be used in any application in which it is desirable to have a treatment fluid that is stimuli-responsive. Suitable subterranean applications in which these stimuli-responsive fluids can be used include pills (e.g., a perforating pill), fracturing fluids, temporary plugs (for example, in tubing), and temporary sealing materials (e.g., in screens).

In a subterranean application context, one of the desirable features of the treatment fluids of the present invention is that a stimuli-responsive water-soluble polymer in combination with a viscoelastic surfactant may be able to viscosify a fluid and aid in decreasing the viscosity upon degradation of the polymer. In addition, the degradation of the polymer may also generate an acid capable of removing a fluid loss control agent and/or a bridging agent, possibly limiting the need for a separate cleanup fluid to remove the fluid loss control agent and/or the bridging agent. As another advantage, the treatment fluids may respond to changes in temperature and/or pH, and contact with any oleaginous fluids. The ability to control the viscosity of the fluid over time using these stimuli may allow for the use of some equipment to be avoided (e.g., coiled tubing to acid spot for gel residue cleanup), thus reducing the overall cost of a well treatment.

Stimuli that may lead to the degradation of the treatment fluids of the present invention may include a change in pH (e.g., caused by the buffering action of the rock or the decomposition of materials that release chemicals such as acids), a change in the temperature of the fluid (e.g., caused by the contact of the fluid with the subterranean formation), or contact with an oleaginous fluid (e.g., caused by contact with oleaginous fluids such as formation hydrocarbons entering the wellbore). The stimuli-responsive polymer is water soluble and may comprise at least one acid-generating degradable group. As the pH changes, the rate of degradation may also change. Thus, a pH change in the fluid can trigger the degradable group in the stimuli-responsive fluids to degrade. Once the degradable group degrade, the stimuli-responsive fluid may break up into smaller molecules that, in preferred embodiments, should be water soluble or, at least, water dispersible. In subterranean applications, these smaller molecules should not be in situ impediments to produced fluids and may be more readily removed than conventional viscosifying agents (e.g., biopolymers). The terms "break" as used herein refer to the continuous loss of gel properties, characterized by a decrease in the elastic modulus (G') of the gelled system. In addition, contact with an oleaginous fluid (e.g., a formation hydrocarbon) may decrease the viscosity of the fluid due to the interactions with the viscoelastic surfactant. For example, the structure of the micelles formed by the viscoelastic surfactants may change upon contact with a hydrocarbon fluid to a less viscosifying structure (e.g., spherical micelles). A change in pH can also affect the structure of the micelles to alter the viscosity of the treatment fluid. Thus, various stimuli can be used to control the breaking of the stimuli-responsive fluids over time.

In an embodiment, a method according to the present invention comprises providing a treatment fluid having a first viscosity comprising: an aqueous base fluid; a stimuli-responsive water-soluble polymer; and optionally, a viscoelastic surfactant; introducing the treatment fluid into a subterranean formation; and allowing the treatment fluid viscosity to change to a second viscosity in response to a stimulus. In an embodiment, the stimuli-responsive polymer comprises a hydrophobically modified polymer and/or a stimuli-degradable polymer, which may include a copolymer comprising an acid generated group and a degradable group. In some embodiments, the stimuli-responsive polymer may comprise a single polymer that is both hydrophobically modified and further comprises an acid generating group, a degradable group, or both.

The aqueous base fluid used in the treatment fluids of the present invention may comprise any suitable aqueous fluid known to one of ordinary skill in the art. Suitable aqueous base fluids may include, but are not limited to, fresh water, saltwater (e.g., water containing one or more salts dissolved therein), brine (e.g., saturated saltwater), weighted brine (e.g., an aqueous solution of sodium bromide, calcium bromide, zinc bromide and the like), or any combination thereof. Generally, the aqueous base fluid may be from any source, provided that it does not contain components that might adversely affect the stability and/or performance of the drilling fluids of the present invention. In certain embodiments, the density of the aqueous base fluid can be increased, inter alia, to provide additional particle transport and suspension in the treatment fluids of the present invention. It will be appreciated that in some embodiments other polar liquids such as alcohols and glycols, alone or together with an aqueous base fluid, may also be used. In an embodiment, the aqueous base fluid is present in the treatment fluid in an amount ranging from about 40% to about 99.9% by weight of the drilling fluid.

The viscoelastic surfactants used in the present invention may comprise any viscoelastic surfactant known in the art, any derivative thereof, or any combination thereof. These viscoelastic surfactants may be cationic, anionic, nonionic or amphoteric in nature. The viscoelastic surfactants may comprise any number of different compounds, including methyl ester sulfonates (e.g., as described in U.S. Pat. Nos. 7,299,874, 7,159,659, 7,303,019, and US Publication No. 2006/0183646, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof. The term "derivative" is defined herein to include any compound that is made from one of the listed compounds, for example, by replacing one atom in the listed compound with another atom or group of atoms, rearranging two or more atoms in the listed compound, ionizing the listed compounds, or creating a salt of the listed compound.

Suitable viscoelastic surfactants may comprise mixtures of several different compounds, including but not limited to: mixtures of an ammonium salt of an alkyl ether sulfate, a cocoamidopropyl betaine surfactant, a cocoamidopropyl dimethylamine oxide surfactant, and water; mixtures of an ammonium salt of an alkyl ether sulfate surfactant, a cocoamidopropyl hydroxysultaine surfactant, a cocoamidopropyl dimethylamine oxide surfactant, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738, the relevant disclosure of which is incorporated herein by reference. Examples of suitable aqueous solutions of an alpha-olefinic sulfonate surfactant and a betaine surfactant are described in U.S. Pat. No. 5,897,699, the relevant disclosure of which is incorporated herein by reference. Suitable viscoelastic surfactants also may comprise "catanionic" surfactant systems, which comprise paired oppositely-charged surfactants that act as counterions to each other and may form wormlike micelles. Examples of such catanionic surfactant systems include, but are not limited to sodium oleate (NaO)/octyl trimethylammonium chloride (C8TAC) systems, stearyl trimethylammonium chloride (C18TAC)/caprylic acid sodium salt (NaCap) systems, and cetyl trimethylammonium tosylate (CTAT)/sodium dodecylbenzenesulfonate (SDBS) systems.

Examples of commercially-available viscoelastic surfactants suitable for use in the present invention may include, but are not limited to, Mirataine BET-O 30™ (an oleamidopropyl betaine surfactant available from Rhodia Inc., Cranbury, N.J.), Aromox APA-T (amine oxide surfactant available from Akzo Nobel Chemicals, Chicago, Ill.), Ethoquad O/12 PG™ (a fatty amine ethoxylate quat surfactant available from Akzo Nobel Chemicals, Chicago, Ill.), Ethomeen T/12™ (a fatty amine ethoxylate surfactant available from Akzo Nobel Chemicals, Chicago, Ill.), Ethomeen S/12™ (a fatty amine ethoxylate surfactant available from Akzo Nobel Chemicals, Chicago, Ill.), and Rewoteric AM TEG™ (a tallow dihydroxyethyl betaine amphoteric surfactant available from Degussa Corp., Parsippany, N.J.).

The viscoelastic surfactant should be present in a fluid of the present invention in an amount sufficient to impart the desired viscosity (e.g., sufficient viscosity to divert flow, reduce fluid loss, suspend particulates, etc.) to the fluid. In certain embodiments, the viscoelastic surfactant may be present in the fluid in an amount in the range of from about 0.01% to about 15% by weight of the fluid. In certain embodiments, the viscoelastic surfactant may be present in an amount in the range of from about 0.5% to about 10% by weight of the fluid.

The treatment fluids of the present invention comprise a stimuli-responsive water soluble polymer. As used herein, "water soluble" refers to at least about 0.01% by weight soluble in water at room temperature (about 72° F.). In some embodiments, the water-soluble polymer is at least about 0.5% by weight soluble in water at room temperature. In an embodiment, the stimuli-responsive water soluble polymer comprises a hydrophobically modified polymer. In an embodiment, the stimuli-responsive water soluble polymer comprises a stimuli-degradable polymer, which may be a copolymer comprising an acid generating group and a degradable group. As used herein, the term "co-polymer" may refer to a block co-polymer, a tri-block copolymer, or a multi-block copolymer. As used herein, the term "group" refers to a combination of bonded atoms, and includes a monomer, a polymer or linking group, a moiety, and the like.

The stimuli-responsive water soluble polymer of the present invention should be added to the treatment fluid in an amount sufficient to form a fluid with the desired viscosity or rheological properties. The stimuli-responsive water soluble polymer should be included in the treatment fluids of the present invention in any amount sufficient for a particular application. In certain embodiments, the stimuli-responsive water soluble polymer may be present in amount in the range of about 0.01% to about 15% by weight of the treatment fluid. In certain embodiments, the stimuli-responsive water soluble polymer may be present in an amount of about 0.1% to about 5% by weight of the treatment fluid. A person of ordinary skill in the art, with the benefit of this disclosure, will recognize the necessary amount of stimuli-responsive water soluble polymer or polymers to include in a particular application of the present invention depending on, among other factors, the other components of the treatment fluids, the desired properties of the treatment fluids, and the like.

In an embodiment, the stimuli-responsive water soluble polymer comprises a hydrophobically modified polymer. Hydrophobically modified polymers that may be used to form the treatment fluids of the present invention may be synthesized by incorporating hydrophobic groups within a hydrophilic polymer backbone of a base polymer using any suitable method. Suitable methods include chain growth polymerization, step growth polymerization, and post-polymerization mechanisms for naturally occurring polymers and polymers that were made by chain or step growth polymerization. In most instances, this is not a post-polymerization modification. Thus, the hydrophobic modification is incorporated within the polymer structure as it forms. However, in some instances, this modification may be performed using post-polymerization, for example, through a suitable modification reaction. Residual monomers may remain in the polymer. Such modified polymers are referred to herein as hydrophobically modified polymers.

Suitable examples of hydrophobic modifications for use in embodiments of the present invention include those formed by the addition of a hydrocarbon group having from about 1 to about 24 carbon atoms that, for example, may comprise a linear or branched alkyl, alkenyl, aryl, alkylaryl, arylalkyl, cycloalkyl, acryloyl, or a mixture thereof. In some embodiments, the hydrocarbon groups may comprise 3 to 16 carbon atoms.

In certain embodiments, the hydrophobically modified polymer or polymers may have a molecular weight in the range from about 500,000 to about 10,000,000. In some embodiments, the molecular weight range may be in the 1,000,000 range+/−500,000. In some embodiments, this molecular weight may vary. For example, when hydrophobically modified polymers are used in the treatment fluids of the present invention, they may be present as a mixture of hydrophobically modified polymers comprising a distribution or range of molecular weights. One of ordinary skill in the art with the benefit of this disclosure will recognize the appropriate length and molecular weight for a given application.

Suitable hydrophobically modified polymers may include, but are not necessarily limited to, those that comprise a monomer or polymer that comprises a unit based on: acrylamides, vinyl alcohols, vinylpyrrolidones, vinylpyridines, acrylates, polyacrylamides, polyvinyl alcohols, polyvinylpyrrolidones, polyvinylpyridines, polyacrylates, polybutylene succinate, polybutylene succinate-co-adipate, polyhydroxybutyrate-valerate, polyhydroxybutyrate-covalerate, polycaprolactones, polyester amides, polyethylene terephthalates, sulfonated polyethylene terephthalate, polyethylene oxides, polyethylenes, polypropylenes, aliphatic aromatic copolyester, polyacrylic acids, polysaccharides (such as dextran or cellulose), chitins, chitosans, proteins, aliphatic polyesters, polylactic acids, poly(glycolides), poly(ϵ-caprolactones), poly(hydroxy ester ethers), poly(hydroxybutyrates), poly(anhydrides), polycarbonates, poly(orthoesters), poly(amino acids), poly(ethylene oxides), poly(propylene oxides), poly(phosphazenes), polyester amides, polyamides, polystyrenes, any derivative thereof, any copolymer, homopolymer, or terpolymer, or any combination thereof. In a further embodiment, the polymer may comprise a compound selected from the group consisting of hydroxyethyl acrylate, acrylamide, and hydroxyethyl methacrylate.

In some embodiments, the monomer that will form a polymer may include an unsaturated group, such as a monomer including a vinyl group. Exemplary vinyl-containing monomers may be described by the formula $C(R_1)(R_2)=C(R_3)(R_4)$, wherein $R_1$, $R_2$, $R_3$ and $R_4$ are segments affecting the solubility or swellability of this monomer in a common solvent. Optionally, $R_1$, $R_2$, $R_3$ and $R_4$ can each be independently selected from, but not limited to, hydrogen, methyl, ethyl, $CONH_2$, $CONHCH_3$, $CON(CH_3)_2$, $CH_2SO_3H$, $CH_2SO_3Na$, and $COONa$.

In some embodiments, the network forming polymers may be formed by a reaction mechanism incorporating an initiator. Suitable initiators may include radical initiators. Examples of suitable initiators may include, but are not limited to, 2,2'-azobis-(2-methylbutyronitrile), 2,2'-azobis(isobutyramidine hydrochloride), 2,2'-azobis[2-(2-imidazolin-2-yl)propane]dihydrochloride, 1,1'-azobis(cyclohexanecarbonitrile), 2,2'-azobis(2-methylpropionamidine)dihydrochloride, 4,4'-azobis(4-cyanovaleric acid), ammonium persulfate, hydroxymethanesulfinic acid monosodium salt dihydrate, potassium persulfate, sodium persulfate, benzoyl peroxide, 1,1-bis(tert-amylperoxy)cyclohexane, 1,1-bis(tert-butylperoxy)cyclohexane, 2,2-bis(tert-butylperoxy)butane, 2,4-pentanedione peroxide, 2,5-bis(tert-butylperoxy)-2,5-dimethylhexane, 2,5-di(tert-butylperoxy)-2,5-dimethyl-3-hexyne; 2-butanone peroxide, cumene hydroperoxide, di-tert-amyl peroxide, dicumyl peroxide, lauroyl peroxide, tert-butyl hydroperoxide, tert-butyl peracetate, tert-butyl peroxide, tert-butyl peroxybenzoate, tert-butylperoxy-2-ethylhexyl carbonate, diethylene glycol dimethacrylate, azobisisobutyronitrile, and any combination thereof. A person of ordinary skill in the art would be able to select an appropriate initiator based upon the hydrophobically modified polymer or monomer involved in the particular reaction. Other suitable initiators may include photoinitiators, thermal initiators, and any combination thereof.

In certain embodiments, the hydrophobically modified polymers of the transient polymer networks may be linear or branched. In some instances, linear polymer backbones impart improved rheological properties to the treatment fluid since they may be able to fold back and forth with less steric hindrance. In certain embodiments of the present invention, the hydrophobically modified polymers may comprise a polymer backbone, the polymer backbone comprising polar heteroatoms, wherein the polar heteroatoms present within the polymer backbone of the hydrophobically modified polymers may include, but are not limited to, oxygen, nitrogen, sulfur, or phosphorous.

In some embodiments, the hydrophobically modified polymers may be modified to comprise one or more acid generating groups on one or more ends (e.g., a branched polymer may comprise a plurality of "ends" of the molecule) of the hydrophobically modified polymer. Examples of suitable acid-releasing degradable groups may include, but are not limited to, an ester, an ortho ether, a poly(ortho ether), an aliphatic polyester, a lactide, a poly(lactide), a glycolide, a poly(glycolide), a lactone, a poly(ε-caprolactone), a poly(hydroxybutyrate), an anhydride, a poly(anhydride), a poly(amino acid), any derivative thereof, and any combination thereof. Suitable acid-releasing degradable groups that may be incorporated into the hydrophobically modified polymer may be considered degradable if the degradation is due, inter alia, to chemical processes, such as hydrolysis, oxidation, or enzymatic decomposition. The appropriate pH-adjusting agent or acid-releasing material and amount thereof may depend upon the formation characteristics and conditions, the other components of the treatment fluid, and other factors known to individuals skilled in the art, with the benefit of this disclosure.

In an embodiment, the stimuli-responsive water soluble polymer comprises a stimuli degradable polymer. The stimuli degradable polymers useful with the treatment fluids of the present invention may comprise a co-polymer where at least one of the polymers comprises a degradable group. Suitable degradable groups may include, but are not limited to, amides, acetals, ketals, orthoesters, carbonates, anhydrides, silyl ethers, alkene oxides, ethers, imines, carbonate urethanes, amino acids, any derivatives thereof, and any combinations thereof. Some of the degradable groups may respond to changes in pH or temperature making them useful in forming a stimuli-responsive water soluble polymer. For example, ortho ester-based groups, acetal-based groups, ketal-based groups, and silicon-based groups may be sensitive to changes in pH. Generally, at room temperature, the ortho ester-based groups should be stable at pHs of above 10, and should degrade at a pH below about 9; the acetal-based groups should be stable at a pH above about 8 and should degrade at a pH below about 6; the ketal-based groups should be stable at pHs of about 7 and should degrade at a pH below 7; and the silicon-based groups should be stable at pHs above about 7 and should degrade faster in acidic media. Thus, under moderately acidic conditions (pH of around 3), the relative stability of these groups should decrease in the following order: amides>ketals>orthoester. At higher well bore temperatures, the more stable degradable groups contain amides or ethers and would be preferred over other choices including esters, acetals, and ketals. Also, some embodiments of the stimuli-degradable polymer are sensitive to changes in temperature. Thus, where the degradable group comprises an ester group, the stimuli-degradable polymer may degrade at about 170° F. in about 10 hours at a pH of about 10.8, whereas when the degradable group comprises an amide, the stimuli-degradable polymer may be stable for several days at a pH of about 10.8 and about 185° F.

In some embodiments, the degradable group comprises an acid generating group. Examples of suitable acid-releasing degradable groups may include, but are not limited to, an ester, an ortho ether, a poly(ortho ether), an aliphatic polyester, a lactide, a poly(lactide), a glycolide, a poly(glycolide), a lactone, a poly(ε-caprolactone), a poly(hydroxybutyrate), an anhydride, a poly(anhydride), a poly(amino acid), any derivative thereof, and any combination thereof.

Suitable ester groups useful with a stimuli degradable polymer of the present invention can be described as being formed when any di, tri, or more functional alcohols react with unsaturated acids or acid chlorides. Suitable ester groups may include, but are not limited to, poly(ethylene glycol), poly(ethylene glycol)diacrylate, poly(ethylene glycol)dimethacrylate, poly(propylene glycol)diacrylate, and hexanediol acrylate. Suitable ether groups may include, but are not limited to, poly(ethylene glycol)divinyl ether, and 1,4-cyclohexane dimethanol divinyl ether. Suitable amide groups may include, but are not limited to, poly(ethylene glycol) bisacrylamide, and N,N'-(1,2-dihydroxyethylene)bisacrylamide, N,O-dimethacryloylhydroxylamine, and N-methyloacrylamide.

The stimuli degradable polymers may also comprise one or more additional monomers or groups. Additional groups may be included in the stimuli-degradable polymers, inter alia, to create a desired molecular weight, desired hydrophobic or hydrophilic characteristics, a desired interactivity with the viscoelastic surfactant, and desired rheological properties both before and after degradation of the degradable group(s). Suitable additional groups may include, but are not limited to, ethylene, propylene, butene-1, vinyl cyclohexane, vinyl cyclohexene, styrene, vinyl toluene, an ionizable monomer, 1-N,N-diethylaminoethylmethacrylate, diallyldimethylammonium chloride, 2-acrylamido-2-methyl propane sulfonate, acrylic acid, an allylic monomer, di-allyl phthalate, di-allyl maleate, allyl diglycol carbonate, vinyl formate, vinyl acetate, vinyl propionate, vinyl butyrate, crotonic acid, itaconic acid, vinyl fluoride, vinyl chloride, vinylidine fluoride, tetrafluoroethylene, acrylamide, methacrylamide, methacrylonitrile, acrolein, methyl vinyl ether, ethyl vinyl ether, vinyl ketone, ethyl vinyl ketone, allyl acetate, allyl propionate, diethyl maleate, a diene monomer, butadiene, isoprene, chloroprene, any derivative thereof, and any combination thereof.

The stimuli-degradable polymers can be prepared by any method known to one of ordinary skill in the art. In an embodiment, the stimuli-degradable polymers may be prepared through a copolymerization reaction. The stimuli-degradable polymers should be suitable for use in the treatment fluid at temperatures typically encountered during subterranean operations. One of ordinary skill in the art, with the benefit of this disclosure, is able to determine the appropriate degradable group to use to form the stimuli-degradable polymers based on, inter alia, bottom hole temperatures that may be encountered and pH. For instance, under moderately acidic conditions (pH of about 3), the stability of amides, ketals, and orthoesters is believed to decrease in the order of amides>ketals>orthoesters. The polymerization of the monomers can be done by any known methods such as free radical polymerization, cationic polymerization, anionic polymerization, condensation polymerization, coordination catalyst polymerization, and hydrogen transfer polymerization. The polymerization can be done in any manner (e.g., solution polymerization, precipitation polymerization, suspension polymerization, emulsion polymerization, and bulk polymerization). These are known methods described in the literature. Which particular method to use may depend on, inter alia, the degradable group and any additional groups used to form the stimuli-degradable polymers, and also the application for the resultant treatment fluid. Suitable temperatures and other conditions for carrying out the polymerization reaction are well known.

In an embodiment, the degradable groups may be present in the stimuli-degradable polymer in an amount of from about 1% to about 60% of the groups used to polymerize the polymer by weight. The overall presence of degradable groups present in the stimuli-degradable polymer may be varied so as to maintain the solubility of the stimuli-degradable polymer in the fluid. The amount of degradable groups present may depend on the presence of other polymers, salts, or additives in the fluid; one of ordinary skill in the art would be able to balance the components of the fluid to maintain solubility of the polymer in the fluid. In an embodiment, the acid-generating degradable groups may be present in the stimuli-degradable polymer in an amount of from about 1% to about 10% of the groups used to polymerize the polymer by weight.

In some embodiments, the stimuli-responsive water soluble polymer may comprise a polymer comprising both hydrophibic modifications and degradable groups, which may be capable of generating an acid upon degradation. A polymer comprising both types of modifications can be prepared according to the methods disclosed herein for the hydrophobic modifications and the incorporation of degradable groups on the polymer.

In some embodiments, the treatment fluids of the present invention may respond to changes in temperature, pH, or the introduction of an oleaginous fluid. The stimuli-responsive water-soluble polymer may be sensitive to changes in temperature and/or pH. In some embodiments, the stimuli-responsive water-soluble polymer may comprise a degradable group, degradation of this bond in the stimuli-degradable polymers should at least partially result in a degradation of the treatment fluid. In an embodiment, the degradable group is capable of undergoing an irreversible degradation. The term "irreversible," as used herein, means that a degradable group or the treatment fluid of the present invention should degrade in situ (e.g., within a well bore and/or a subterranean formation) but should not reform in situ after degradation. The terms "degradation" and/or "degradable," as used herein, refer to the conversion of materials into smaller components, intermediates, or end products by chemical processes such as hydrolytic degradation or by the action of biological entities, such as bacteria or enzymes. It refers to both heterogeneous (or bulk erosion) and homogenous (or surface erosion), and any stage of degradation between these two on the degradable group. This degradation may be the result of, inter alia, a chemical reaction, a thermal reaction, an enzymatic reaction, or a reaction induced by radiation. The rates at which such degradable groups degrade are dependent on the environment to which the treatment fluid is subjected, e.g., temperature, the presence of moisture, oxygen, microorganisms, enzymes, pH, and the like may affect the rate of degradation.

Among other things, as stated above, degradation of the degradable group may be sensitive to pH and temperature. Generally speaking, with an increase in temperature, the degradation (e.g., due to hydrolysis) of the degradable group should generally be faster. In an embodiment, the treatment fluid may experience a change in viscosity (e.g., the treatment fluid may break) upon exposure to a subterranean formation with a temperature in the range of about 60° F. to about 200° F. The rate of degradation may increase as the pH of the treatment fluid drops. In an embodiment, an acid-generating degradable group may release an acid upon degradation, lowering the pH of the treatment fluid. Thus, the rate of degradation may increase as any acid-generating degradable groups continue to degrade and lower the pH of the treatment fluid. In an embodiment, the treatment fluid may experience a change in viscosity (e.g., the treatment fluid may break) upon exposure to a subterranean formation with a pH in the range of about 2 to about 10.

In some embodiments, the treatment fluid may be broken more rapidly by contacting the treatment fluid with an acid to lower the pH of the treatment fluid. Examples of suitable acids may include, but are not limited to, hydrochloric acid, hydrofluoric acid, formic acid, phosphoric acid, sulfuric acid, and acetic acid, and derivatives thereof, and mixtures thereof. In other embodiments, a delayed-release acid, such as an acid-releasing degradable material or an encapsulated acid, may be included in the treatment fluid so as to reduce the pH of the treatment fluid at a desired time, for example, after introduction of the treatment fluid into the subterranean formation. Suitable encapsulated acids that may be included in the treatment fluids of the present invention include, but are not limited to, fumaric acid, formic acid, acetic acid, acetic anhydride, anhydrides, hydrochloric acid, and hydrofluoric acid, and combinations thereof, and the like. Exemplary encapsulation methodology is described in U.S. Pat. Nos.

5,373,901; 6,444,316; 6,527,051; and 6,554,071, the relevant disclosures of which are incorporated herein by reference.

In some embodiment, acid-releasing degradable materials also may be separately included in the treatment fluids of the present invention to decrease the pH of the fluid. Suitable acid-releasing degradable materials that may be used in conjunction with the present invention are those materials that are substantially water-insoluble such that they degrade over time, rather than instantaneously, to produce an acid. Examples of suitable acid-releasing degradable materials include esters, polyesters, orthoesters, polyorthoesters, lactides, polylactides, glycolides, polyglycolides, substituted lactides wherein the substituted group comprises hydrogen, alkyl, aryl, alkylaryl, and acetyl, and mixtures thereof, substantially water-insoluble anhydrides, and poly(anhydrides), and mixtures and copolymers thereof. The appropriate pH-adjusting agent or acid-releasing material and amount thereof may depend upon the formation characteristics and conditions, the particular viscoelastic surfactant chosen, and other factors known to individuals skilled in the art, with the benefit of this disclosure.

In some embodiments, contact with an oleaginous fluid (e.g., a formation hydrocarbon) may decrease the viscosity of the fluid due to the interactions with the viscoelastic surfactant. For example, the viscoelastic surfactants may form elongated or rod-like micelles or structures that can control the viscosity of the treatment fluid. Upon contact with an oleaginous fluid the micelles may form more spherical micelles that cannot viscosify the fluid to the same extent as an elongated micelle, thus contributing to the breaking of the treatment fluid. A change in pH can also affect the structure of the micelles to alter the viscosity of the treatment fluid.

In an embodiment, a variety of additives may be optionally included in the treatment fluids of the present invention. Suitable additives may include, but are not limited to, foaming agents, particulates, inhibitors, bridging agents, fluid loss control agents, and any other suitable additives that do not detrimentally affect the treatment fluid.

In some embodiments, the treatment fluid may be foamed. One advantage of using a foamed treatment fluid over a non-foamed version is that less of the aqueous fluid may be used, relatively speaking. This may be important in subterranean formations that are water-sensitive or under pressure. In some embodiments, the foamed treatment fluids have a foam quality of about 30% or above. These may include commingled fluids. A preferred foam quality level is about 50% or above.

When the treatment fluid is foamed, the treatment fluid may comprise an additional surfactant. The choice of whether to use an additional surfactant will be governed at least in part by the mineralogy of the formation and the composition of the viscoelastic surfactant. As will be understood by those skilled in the art, anionic, cationic, nonionic, or amphoteric surfactants also may be used so long as the conditions they are exposed to during use are such that they display the desired foaming properties. For example, in particular embodiments, mixtures of cationic and amphoteric surfactants may be used. When used in treatment fluid embodiments, the surfactant is present in an amount of from about 0.01% to about 5% by volume. When foamed, the base fluid may comprise a gas. While various gases can be utilized for foaming the treatment fluids of this invention, nitrogen, carbon dioxide, and mixtures thereof are preferred. In examples of such embodiments, the gas may be present in a base fluid and/or a delayed tackifying composition in an amount in the range of from about 5% to about 95% by volume, and more preferably in the range of from about 20% to about 80%. The amount of gas to incorporate into the fluid may be affected by factors including the viscosity of the fluid and bottomhole pressures involved in a particular application. Examples of preferred foaming agents that can be utilized to foam the base fluid and/or the delayed tackifying composition of this invention include, but are not limited to, alkylamidobetaines such as cocoamidopropyl betaine, alpha-olefin sulfonate, trimethyltallowammonium chloride, $C_8$ to $C_{22}$ alkylethoxylate sulfate, and trimethylcocoammonium chloride. Other suitable foaming agents and foam-stabilizing agents may be included as well, which will be known to those skilled in the art with the benefit of this disclosure. The foaming agent is generally present in a treatment fluid of the present invention in an amount in the range of from about 0.01% to about 5%, by volume, more preferably in the amount of from about 0.2% to about 1%, and most preferably about 0.6% by volume.

The treatment fluids of the present invention optionally may comprise particulates, such as proppant particulates or gravel particulates. Particulates suitable for use in the present invention may comprise any material suitable for use in subterranean operations. Suitable materials for these particulates include, but are not limited to, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The particulate size generally may range from about 2 mesh to about 400 mesh on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

To delay the degradation of a degradable group, an inhibitor may be included in the treatment fluid. Suitable inhibitors may include bases. Examples of suitable inhibitors may include metal hydroxides, potassium hydroxide, amines such as hexamethylenetetramine, and sodium carbonate, and combinations thereof. In certain embodiments, a small amount of a strong base as opposed to a large amount of a relatively weak base is preferred to achieve the delayed degradation.

The treatment fluids of the present invention may comprise bridging agents. Preferably, when used, the bridging agents are either acid-degradable, self-degrading or degradable in a suitable clean-up solution (e.g., a mutual solvent, water, an acid solution, etc.). Examples of bridging agents suitable for use in the methods of the current invention include, but are not necessarily limited to, magnesium citrate, calcium citrate, calcium succinate, calcium maleate, calcium tartrate, magnesium tartrate, bismuth citrate, calcium carbonate, sodium chloride and other salts, and the hydrates thereof. Examples of degradable bridging agents may include, but are not necessarily limited to, bridging agents comprising degradable materials such as degradable polymers. Specific examples of suitable degradable polymers include, but are not necessarily limited to, polysaccharides such as dextrans or celluloses; chitins; chitosans; proteins; orthoesters; aliphatic polyesters; poly(lactides); poly(glycolides); poly(ϵ-caprolactones); poly (hydroxybutyrates); poly(anhydrides); aliphatic polycarbonates; poly(orthoesters); poly(amino acids); poly(ethylene oxides); and polyphosphazenes. Any combination or derivative of these are suitable as well. One suitable commercially available lightweight particulate is a product known as "BIO VERT" manufactured by Halliburton Energy Services, located in Duncan, Okla. BIO VERT is a polymer material comprising 90-100% polylactide and having a specific gravity of about 1.25. As an advantage of the present invention, the degradation of any degradable groups present in the treatment fluid may form an in situ cleanup solution capable of removing any bridging agent present.

When choosing a particular bridging agent to use, one should be aware of the performance of that bridging agent at the temperature range of the application. The bridging agents utilized may be generally present in the treatment fluid compositions in an amount in the range of from about 1% to about 40% by weight thereof, more preferably from about 5% to about 25%. Generally, the bridging agents may have a particle size in the range of from about 1 micron to about 600 microns. Preferably, the bridging particle size is in the range of from about 1 to about 200 microns but may vary from formation to formation. The particle size used is determined by the pore throat size of the formation.

The treatment fluids of the present invention also may comprise a suitable fluid loss control agent. Any fluid loss agent that is compatible with the treatment fluids of the present invention is suitable for use in the present invention. Examples include, but are not limited to, microgels, starches, silica flour, gas bubbles (energized fluid or foam), benzoic acid, soaps, resin particulates, relative permeability modifiers, degradable gel particulates, and other immiscible fluids. Another example of a suitable fluid loss control additive is one that comprises a degradable polymer, such as those listed above. If included, a fluid loss additive should be added to a treatment fluid of the present invention in an amount necessary to give the desired fluid loss control. In some embodiments, a fluid loss additive may be included in an amount of about 5 to about 2000 lbs/Mgal of the treatment fluid. In some embodiments, the fluid loss additive may be included in an amount from about 10 to about 50 lbs/Mgal of the treatment fluid.

The treatment fluid may be prepared using any method known to one of ordinary skill in the arts. In general, the viscoelastic surfactant and the stimuli-responsive water-soluble polymer may be combined with the aqueous base fluid to form the treatment fluid. Suitable time to hydrate the stimuli-responsive water-soluble polymer may be required prior to using the treatment fluid. Any optional additives may be added to the treatment fluid prior to its use in a subterranean operation. The treatment fluid may be prepared offsite and transported to the well site, or the treatment fluid may be prepared at the well site.

In some embodiments, the stimuli-responsive fluids of the present invention may be used as part of a subterranean treatment operation. In an embodiment, a method according to the present comprises providing a treatment fluid having a first viscosity comprising an aqueous base fluid; a viscoelastic surfactant; and a stimuli-responsive water-soluble polymer; introducing the treatment fluid into a subterranean formation; and allowing the treatment fluid viscosity to change to a second viscosity in response to a stimulus. The viscosity may change, or break in response to one or more stimuli comprising temperature, pH, or contact with an oleaginous fluid.

In an embodiment, the treatment fluid may be used as a pill, such as a perforating pill. Perforating generally involves the creation of one or more perforations or communication paths in the casing, liner, and/or subterranean formation to achieve efficient communication between the reservoir and the wellbore. The characteristics and placement of the perforations can have significant influence on the productivity of the well. Perforations can be formed by a perforating gun assembly with the appropriate configuration of shaped explosive charges and the means to verify or correlate the correct perforating depth, which can be deployed on wireline, tubing or coiled tubing. A perforating pill is generally a fluid placed in the wellbore over an interval in a subterranean formation to be perforated. The perforating pill fluid may be clean and solids-free, and generally does not react upon contact with the subterranean formation to cause damaging by-products. Perforating in the presence of a dirty fluid may result in significant permeability damage that is difficult to treat and remove. Methods of perforating are known to those of ordinary skill in the art.

In an embodiment, the treatment fluid of the present invention may be used as a perforating pill in a perforating operation. In an embodiment, a method comprises providing a treatment fluid having a first viscosity and comprising: an aqueous base fluid; a viscoelastic surfactant; and a stimuli-responsive water soluble polymer; introducing the treatment fluid into a subterranean formation comprising a wellbore; forming a perforation in the wellbore in the presence of the treatment fluid; and allowing the treatment fluid viscosity to change in response to a stimulus. The treatment fluid may optionally comprise a bridging agent and/or a fluid loss control agent. In some embodiments, the degradation of the stimuli responsive polymer may result in the generation of an acid that is capable of removing at least a portion of the bridging agent and/or the fluid loss control agent.

The treatment fluid of the present invention may also be used in conjunction with other types of treatment operations (e.g., a fracturing fluid, a gravel pack fluid, or a frac-pack fluid) or as a pill, for example as a fluid loss control pill. A "fluid-loss control pill" is a gelled fluid that is designed or used to provide some degree of fluid-loss control. Through a combination of viscosity, solids bridging, and cake buildup on the porous rock, these pills oftentimes are able to reduce fluid loss from portions of a formation. They also generally enhance filter-cake buildup on the face of the formation to inhibit fluid flow into the formation from the well bore.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing a treatment fluid having a first viscosity comprising:
   an aqueous base fluid;
   a viscoelastic surfactant; and
   a stimuli-responsive water-soluble polymer that comprises a hydrophobically modified polymer that comprises a backbone polymer comprising at least one selected from the group consisting of vinylpyrrolidone, vinylpyridine, polyvinylpyrrolidone, polyvinylpyridine, polybutylene succinate, polybutylene succinate-co-adipate, polyhydroxybutyrate-valerate, polyhydroxybutyrate-covalerate, polyethylene terephthalate, sulfonated polyethylene terephthalate, polypropylene, a protein, polylactic acid, poly(glycolide), poly($\epsilon$-caprolactone), poly(hydroxy ester ether), poly(hydroxybutyrate), polycarbonate, a poly (amino acid), poly(phosphazene), polyester amide, polystyrene, any derivative thereof, any copolymer thereof, any homopolymer thereof, any terpolymer thereof, and any combination thereof;
   introducing the treatment fluid into a subterranean formation; and
   allowing the treatment fluid viscosity to change to a second viscosity in response to a stimulus.

2. The method of claim 1 wherein the aqueous fluid comprises at least one component selected from the group consisting of: fresh water, saltwater, glycol, brine, weighted brine, and any combination thereof.

3. The method of claim 1 wherein the viscoelastic surfactant comprises at least one surfactant selected from the group consisting of: a cationic surfactant, an anionic surfactant, a nonionic surfactant, an amphoteric surfactant, and any combination thereof.

4. The method of claim 1 wherein the viscoelastic surfactant comprises at least one surfactant selected from the group consisting of: a methyl ester sulfonate; a hydrolyzed keratin; a sulfosuccinate; a taurate; an amine oxide; an ethoxylated amide; an alkoxylated fatty acid; an alkoxylated alcohol; an ethoxylated fatty amine; an ethoxylated alkyl amine; a betaine; a modified betaine; an alkylamidobetaine; a quaternary ammonium compound; a mixture of an ammonium salt of an alkyl ether sulfate, a cocoamidopropyl betaine surfactant, a cocoamidopropyl dimethylamine oxide surfactant, and sodium chloride; a mixture of an ammonium salt of an alkyl ether sulfate surfactant, a cocoamidopropyl hydroxysultaine surfactant, a cocoamidopropyl dimethylamine oxide surfactant, and sodium chloride; a mixture of an ethoxylated alcohol ether sulfate surfactant, an alkyl or alkene amidopropyl betaine surfactant, and an alkyl or alkene dimethylamine oxide surfactant; a mixture of an alpha-olefinic sulfonate surfactant and a betaine surfactant; any derivative thereof, and any combination thereof.

5. The method of claim 1 wherein the stimuli responsive polymer comprises a stimuli-degradable polymer, wherein the stimuli-degradable polymer is a copolymer comprising an acid generating group and a degradable group.

6. The method of claim 5 wherein the acid generating group comprises a monomer or polymer selected from the group consisting of: an ester, an ortho ether, a poly(ortho ether), an aliphatic polyester, a lactide, a poly(lactide), a glycolide, a poly(glycolide), a lactone, a poly($\epsilon$-caprolactone), a poly(hydroxybutyrate), an anhydride, a poly(anhydride), a poly (amino acid), any derivative thereof, and any combination thereof.

7. The method of claim 5 wherein the degradable group comprises a monomer or polymer selected from the group consisting of: an amide, an acetal, a ketal, an orthoester, a carbonate, an anhydride, a silyl ether, an alkene oxide, an ether, an imine, a carbonate urethane, an amino acid, any derivative thereof, and any combination thereof.

8. The method of claim 5 wherein the degradable group comprises a monomer or polymer selected from the group consisting of: poly(ethylene glycol), poly(ethylene glycol) diacrylate, poly(ethylene glycol) dimethacrylate, poly(propylene glycol)diacrylate, hexanediol acrylate, poly(ethylene glycol)divinyl ether, 1,4-cyclohexane dimethanol divinyl ether, poly(ethylene glycol)bisacrylamide, N,N'-(1,2dihydroxyethylene)bisacrylamide, N,O-dimethacryloylhydroxylamine, N-methyloacrylamide, any derivative thereof, and any combination thereof.

9. The method of claim 5 wherein the stimuli-degradable polymer further comprises a monomer or polymer selected from the group consisting of: ethylene, propylene, butene-1, vinyl cyclohexane, vinyl cyclohexene, styrene, vinyl toluene, an ionizable monomer, 1-N,N-diethylaminoethylmethacrylate, diallyldimethylammonium chloride, 2-acrylamido-2-methyl propane sulfonate, acrylic acid, an allylic monomer, di-allyl phthalate, di-allyl maleate, allyl diglycol carbonate, vinyl formate, vinyl acetate, vinyl propionate, vinyl butyrate, crotonic acid, itaconic acid, vinyl fluoride, vinyl chloride, vinylidine fluoride, tetrafluoroethylene, acrylamide, methacrylamide, methacrylonitrile, acrolein, methyl vinyl ether, ethyl vinyl ether, vinyl ketone, ethyl vinyl ketone, allyl acetate, allyl propionate, diethyl maleate, a diene monomer, butadiene, isoprene, chloroprene, any derivative thereof, and any combination thereof.

10. The method of claim 1 wherein the stimuli responsive polymer is present in the treatment fluid in an amount ranging from about 0.01% to about 15% by weight of the treatment fluid.

11. The method of claim 1 wherein the viscoelastic surfactant is present in the treatment fluid in an amount ranging from about 0.01% to about 15% by weight of the treatment fluid.

12. The method of claim 1 wherein the stimulus comprises at least one input selected from the group consisting of: temperature, pH, and contact with an oleaginous fluid.

13. The method of claim 12 wherein the stimulus comprises temperature, and wherein the temperature of the subterranean formation is in the range of about 60° F. to about 200° F.

14. The method of claim 12 wherein the stimulus comprises pH, and wherein the pH of the subterranean formation is in the range of about 2 to about 10.

15. The method of claim 1 wherein the treatment fluid further comprises a fluid loss control agent.

16. A method comprising:
providing a treatment fluid having a first viscosity and comprising:
an aqueous base fluid;
a viscoelastic surfactant; and
a stimuli-responsive water soluble polymer that comprises a hydrophobically modified polymer that comprises a backbone polymer comprising at least one selected from the group consisting of vinylpyrrolidone, vinylpyridine, polyvinylpyrrolidone, polyvinylpyridine, polybutylene succinate, polybutylene succinate-co-adipate, polyhydroxybutyrate-valerate, polyhydroxybutyrate-covalerate, polyethylene terephthalate, sulfonated polyethylene terephthalate, polypropylene, a protein, polylactic acid, poly(glycolide), poly($\epsilon$-caprolactone), poly(hydroxy ester ether), poly(hydroxybutyrate), polycarbonate, a poly(amino acid), poly(phosphazene), polyester amide, polystyrene, any derivative thereof, any copolymer thereof, any homopolymer thereof, any terpolymer thereof, and any combination thereof;
introducing the treatment fluid into a subterranean formation comprising a wellbore;
forming a perforation in the wellbore in the presence of the treatment fluid; and
allowing the treatment fluid viscosity to change in response to a stimulus.

17. The method of claim 16 wherein the viscoelastic surfactant comprises at least one surfactant selected from the group consisting of: a cationic surfactant, an anionic surfactant, a nonionic surfactant, an amphoteric surfactant, and any combination thereof.

18. The method of claim 16 wherein the stimuli responsive polymer comprises a hydrophobically modified polymer, a stimuli-degradable polymer, or any combination thereof.

19. The method of claim 16 wherein the stimulus comprises at least one input selected from the group consisting of: temperature, pH, and contact with an oleaginous fluid.

20. The method of claim 16 wherein the treatment fluid further comprises a fluid loss control agent.

21. The method of claim 16 wherein the stimuli responsive polymer comprises stimuli-degradable polymer capable of generating an acid, further comprising allowing the acid generating polymer to generate an acid wherein the acid degrades the fluid loss control agent.

22. The method of claim 16 wherein the treatment fluid further comprises a proppant particulate.

23. A method comprising:
providing a treatment fluid having a first viscosity comprising:
an aqueous base fluid;
a viscoelastic surfactant; and
a stimuli-responsive water-soluble polymer that comprises a hydrophobically modified polymer that comprises an acid-releasing degradable group and a degradable group, the acid-releasing degradable group comprising at least one selected from the group consisting of an ortho ether, a poly(ortho ether), a lactide, a poly(lactide), a glycolide, a poly(glycolide), a lactone, a poly($\epsilon$-caprolactone), a poly(hydroxybutyrate), a poly(amino acid), any derivative thereof, and any combination thereof, and the degradable group comprising at least one selected from the group consisting of an amide, an acetal, a ketal, an orthoester, a carbonate, an anhydride, a silyl ether, an alkene oxide, an ether, an imine, a carbonate urethane, an amino acid, any derivative thereof, and any combination thereof;
introducing the treatment fluid into a subterranean formation; and
allowing the treatment fluid viscosity to change to a second viscosity in response to a stimulus.

* * * * *